United States Patent [19]

Swartout

[11] 4,370,899

[45] Feb. 1, 1983

[54] FLYWHEEL FOR KINETIC ENERGY STORAGE

[75] Inventor: Bruce E. Swartout, San Juan Capistrano, Calif.

[73] Assignee: U.S. Flywheels, Inc., Irvine, Calif.

[21] Appl. No.: 170,463

[22] Filed: Jul. 21, 1980

Related U.S. Application Data

[62] Division of Ser. No. 942,112, Sep. 13, 1978, Pat. No. 4,285,251.

[51] Int. Cl.³ .............................................. G05G 1/00
[52] U.S. Cl. ...................................... 74/572; 474/196
[58] Field of Search .................. 74/572; 474/195, 196, 474/197

[56] References Cited

U.S. PATENT DOCUMENTS

| | | | |
|---|---|---|---|
| 857,303 | 6/1907 | Richards | 474/196 |
| 3,296,886 | 1/1967 | Reinhart . | |
| 3,318,165 | 5/1967 | McAleer et al. | 474/196 |
| 3,363,479 | 1/1968 | Pickels | 74/572 |
| 3,602,066 | 8/1971 | Wetherbee . | |
| 3,602,067 | 8/1971 | Wetherbee . | |
| 3,788,162 | 1/1974 | Rabenhorst et al. . | |
| 3,964,341 | 1/1976 | Rabenhorst . | |
| 4,000,665 | 1/1977 | Rabenhorst . | |
| 4,020,714 | 5/1977 | Rabenhorst . | |
| 4,036,080 | 7/1977 | Friedericy et al. . | |

Primary Examiner—Kenneth Dorner
Attorney, Agent, or Firm—Fischer, Tachner & Strauss

[57] ABSTRACT

A unitary, wide rim of fiber composite material for use in conjunction with flywheels for inertial energy storage apparatus, the rim being fabricated to minimize radial stresses and equalize hoop stresses ordinarily produced at high speed rotation of the flywheel. Novel fabrication techniques include varying the density of the rim as a function of radius by means of ballasting; and using a combination of layers of fibers having different modulus of elasticity. By utilizing the aforesaid novel fabrication techniques, a preferred embodiment of a unitary, thick flywheel rim achieves radial stress reduction to trivial levels and hoop stress equalization sufficient to permit extremely efficient energy storage as a function of flywheel weight.

3 Claims, 24 Drawing Figures

FLYWHEEL FOR KINETIC ENERGY STORAGE

CROSS-REFERENCES TO RELATED APPLICATIONS

This is a division of application Ser. No. 942,112 filed Sept. 13, 1978, now U.S. Pat. No. 4,285,251, issued Aug. 25, 1981.

Patent application Ser. No. 942,054 filed concurrently herewith, and Patent application Ser. No. 945,104, filed on Sept. 25, 1978, both pertain to related subject matter.

BACKGROUND OF THE INVENTION

This invention relates generally to flywheels used for kinetic energy storage, and more specifically, to a fiber composite material unitary rim used in such flywheels.

The principle of the flywheel, which has been recognized for a very long time, is that a spinning wheel stores mechanical kinetic energy. Until recently, it was thought that employing flywheels to store energy for modern technological applications was out of the question because of the cost and low efficiency of energy storage as compared to flywheel weight. However, this picture has been radically changed by recent advances in materials technology and in flywheel design.

The amount of energy stored in the flywheel depends upon the mass of the rim and the angular velocity of the wheel. Energy storage varies as the square of the rotational velocity. In theory, the amount of energy that may be stored in a given flywheel may be increased indefinitely with the speed of the flywheel. However, as is well known in the art, there is a limit to the amount of energy that may be stored in a given flywheel which is dependent upon the tensile strength of the material from which the flywheel is constructed and the manner in which the various stresses created are distributed in the flywheel. For example, it has been determined that for a given flywheel weight, the best material for storing the most energy consists of a material which is of extremely low density to reduce the stresses in the wheel and which is extremely strong to withstand the stresses that are created. In so far as flywheel design is concerned, it is also known that the mass located towards the rim of the wheel contributes far greater to the energy storage than mass located towards the center of the wheel.

Flywheels have traditionally been made of metal such as high strength steel. However, because of its high density, steel is not suitable for making a flywheel capable of storing large amounts of energy for a given weight flywheel. It has been found that materials comprising a composite of fiber have much more suitable properties for flywheel construction. Such fiber composite materials are much lower in density than steel while being at least equally strong, and far stronger in some cases, than the strongest steel alloys. However, despite their superior strength, fiber composite rims are still subject to possibly destructive forces in the form of radial and hoop stress produced at extremely high rotational velocities. As a result, there have been numerous prior art attempts to produce fiber composite rims that would stand the high stresses produced, but that still permit extremely high energy storage with high rotational velocity, such as 32,000 revolutions per minute.

In an effort to overcome these problems, complex and costly fiber composite material rims have been proposed in the prior art. One example of this prior art is the multi-rim flywheel disclosed by Post in U.S. Pat. No. 3,859,868. However, this multi-rim concept requires numerous separate portions to produce a workable multiple rim, each such rim interconnected with the adjacent rim. The multi-element rim and the devices to interconnect the rims and to connect a hub or axle to the first or inner-rim, thus add greatly to the cost of production.

SUMMARY OF THE INVENTION

The present invention comprises a fiber composite material rim which is capable of resisting the otherwise destructive stresses but which does so without the costly and complex multi-rim configuration disclosed in the Post patent. On the contrary, the present invention is a unitary, wide rim of fiber composite material which may be fabricated to resist the radial and hoop stresses produced at high speed rotation by means of certain novel fabrication techniques herein disclosed. These novel techniques of fabricating a unitary fiber composite material rim, relate to the material mixture and density of the rim, to the tension of the fiber as it is wound to form the rim and to the geometry of the winding process. Each such technique individually, and in combination, permits realization of a relatively inexpensive and simple fiber composite material rim which results in the achievement of the numerous advantages of fiber material rims as compared to prior art metal rims, but which achieves these advantages without incurring the disadvantageous high production and material costs associated with prior art fiber rims.

It is well known in the art that there are potentially destructive effects of the stresses produced at high rotational velocity, such as the delaminating or separating of fiber due to the substantial variation in stresses as a function of radius of the rim. For example, hoop stress is highest at the inner-surface of the rim, while radial stress is highest midway between the inner and outer edges of the rim.

It is a principle feature of the present invention to provide a flywheel rim which is the product of fabrication techniques which minimize radial stress and equalize the effect of the otherwise unequal hoop stresses on the rim at high rotational velocity. These stress reduction and equalizing processes include:

Varying the density of the rim as a function of radius by ballasting the polymer or epoxy matrix material with which the fiber is wound, with a high density material such as powdered lead or iron and to perform this ballasting, or density variation, in accordance with a preselected function of density versus rim radius which tends to equalize the effect of the unequal stresses produced at the high speed rotation.

Another aspect is varying the ratio of fiber and polymer or epoxy matrix in accordance with a preselected function of rim radius to result in added flexability in the fiber material at the inner-surface of the rim, that is, the point of highest hoop stress, and to increase that ratio towards the outer-edge of the rim until the fiber fraction is in the range of 70–80% which is regarded as the ratio of fiber and epoxy to yield maximum strength.

Another aspect is to increase the tension of the fiber as it is wound, in accordance with a function of radius. For example, one such technique would be to increase the tension of the fiber from the inside surface of the rim to the outside surface to achieve a designed change in modulus of elasticity to minimize the effects of radial stress and to equalize the effects of hoop stress.

Another aspect is to use a combination of rim layers of different fibers as a function of radius to achieve the variation in modulus of elasticity and strength to equalize the effect of the various unequal stresses.

Still another aspect of equalizing the above indicated unequal stresses, is to vary the winding geometry as a function of radius. For example, to progressively reduce the hoop stress effects as a function of decreasing rim radius, greater length is added to the winding of fibers on the inside of the rim. With this length progressively shortened as the fiber is wound, the greatest amount of slack in the fiber is available at the inner-portion of the rim. As a result, hoop stress effects as a function of radius are equalized because there is less fiber elongation at the inside of the rim where the hoop stresses are normally the greatest.

It is thus an object of the present invention to provide a fiber composite material flywheel rim that is relatively wide and of unitary design that substantially obviates the higher cost and performance limitations of the prior art.

It is another object of the present invention to provide a unitary, thick, fiber composite material flywheel rim which employs one or more novel features of construction to resist the destructive forces of unequal stresses produced at high rotational velocities.

It is still another object of the present invention to increase fiber tension outwardly during the winding of the flywheel fiber composite rim to, in effect, build in compressive forces to reduce the effects of radial spinning stresses and thus permit increased rim thickness.

It is still another object of the present invention to utilize a combination of rim layers of different fibers in a flywheel fiber composite rim to increase the modulus of elasticity with increasing radius.

It is still another object of the present invention to apply a high density material to the epoxy matrix of the fiber composite during the winding of a flywheel fiber rim to result in density ballasting that varies as a function of rim radius to minimize the effect of radial and hoop stresses incurred at high speed rotation.

It is still another object of the present invention to provide a fiber composite material flywheel rim in which the length of the fiber is varied as a function of rim radius to produce a degree of slack which is greatest at the inner-portion of the rim and which decreases as a function of rim radius.

It is still another object of the present invention to utilize in combination, two or more of the foregoing stress resistant production techniques to provide a unitary flywheel rim capable of rotation at speeds higher than heretofore possible and which is more resistant to destructive stresses.

BRIEF DESCRIPTION OF THE DRAWINGS

Other objects and advantages of the present invention will become apparent from the following detailed description when considered in conjunction with the accompanying drawings in which.

DETAILED DESCRIPTION OF THE INVENTION

Figure 1:
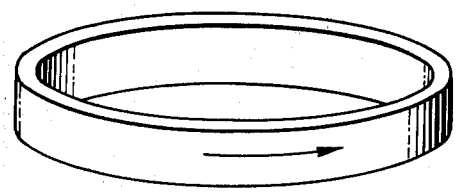
FIG. 1 is an illustrative example of a thin rim used to explain the theoretical parameters of the invention.
Figure 2:
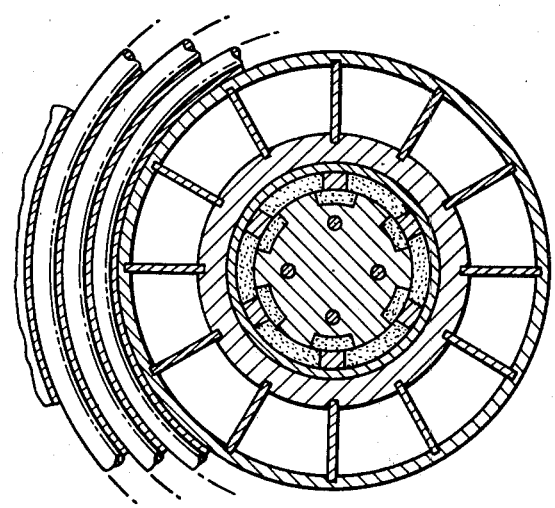
FIG. 2 is an example of a flywheel that employs a prior art fiber material multiple thin-rim concept.

As previously indicated, flywheels are usually thought of as heavy metallic circular devices for storing kinetic energy, whereas advanced design concepts relate to thin rim flywheels of composite materials. The limit to the amount of kinetic energy stored in a flywheel is related to the tensile strength of constituent material. For a thin rim flywheel such as that illustrated in FIG. 1, the tensile strength must be sufficient to withstand the hoop stress resulting from the centrifugal forces. For such a thin rim rotating about a central axis, the significant stress and deformation relations are:

$\sigma_r = 0$ $\sigma_\theta = \rho \omega^2 r^2$ $u_r = \rho \omega^2 r^3 / E$ where
$\sigma_r$ = radial stress
$\sigma_\theta$ = hoop stress
$U_r$ = radial displacement
$\rho$ = mass per unit volume
$\omega$ = angular velocity
$r$ = radius of rim
$\omega_r$ = peripheral speed
$E$ = elastic modulus The advantage of composite thin rim flywheels over conventional heavy metallic circular devices is that composites generally can store more energy per unit mass than metallic alloys. In order to increase the kinetic energy per unit volume, one prior art technique has been to utilize a plurality of concentric thin rims such as that illustrated in FIG. 2. This prior art example of a fiber composite material rim employs a complex and costly multi-ring structure such as that disclosed in U.S. Pat. No. 3,859,868. Illustrative of the complexity of the aforesaid prior art multi-ring rim is the disclosure in that patent that the rim comprises 120 high strength rings disposed in 8 concentric cylindrical shells. It is further disclosed that in some embodiments the number of rings may exceed 1,000. In addition, each such ring is bounded by a pair of cylinders which add even further to the complexity and cost of the prior art rim.

Figure 3:
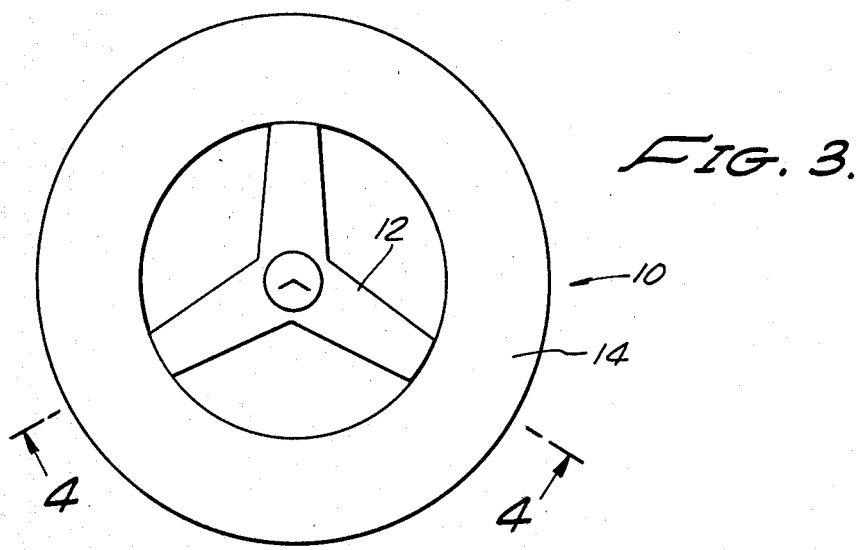
FIG. 3 is a top view of a flywheel in which the novel rim of the present invention is utilized.
Figure 4:
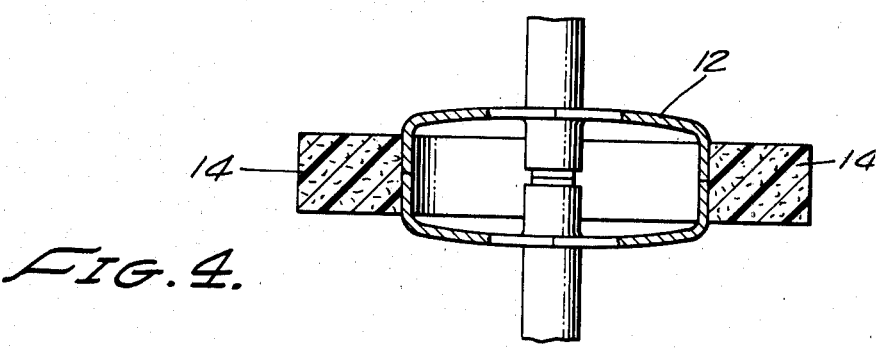
FIG. 4 is a side view of the flywheel shown in FIG. 2 taken along lines 3—3 of FIG. 2.
Figure 5:
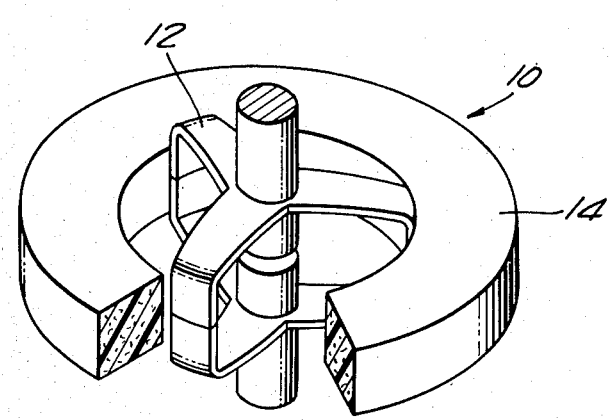
FIG. 5 is an isometric view of the flywheel of FIGS. 3 and 4 including the rim of the present invention.

Although the elasticity-density ratio of each such prior art rim increases with the mean radius; where the term elasticity-density ratio is defined as a quotient of the circumferential Young's modulus of a particular ring divided by its mean density, the means by which this increase is achieved, adds greatly to the cost and complexity of the prior art rim disclosed in the above referenced patent. The above indicated variation of elasticity-density ratio is also achieved by means of the applicant's teaching as will be disclosed hereinafter in the detailed description of the invention. However, it will be apparent that as a result of the novel teaching herein disclosed, the rim of the present invention may be made as a single, wide, unitary structure which still provides a desired elasticity-density ratio increase with radius and thus permits reduction of radial stresses and equalization of hoop stresses across the radial cross-section of the rim, but without incurring the disadvantageous multi-thin ring complex structure of the prior art of which the teaching of the aforesaid patent is one example The unitary, thick rim concept of the present invention is illustrated in FIGS. 3, 4 and 5. The term "thick rim" as used herein, is defined as a rim in which the ratio of inner radius to outer radius is equal to or less than 0.75. In the embodiment illustrated herein, the rim has an inner radius of 6 inches and an outer radius of 10 inches. Rim 14 is mounted on hub 12, which is a novel double-spider shaped domed hub disclosed and claimed in co-pending patent application Ser. No. 942,054 filed concurrently herewith. Because of the unitary construction of the rim of the present invention and the unitary structure of the novel hub to which the present invention is particularly suited for connection, the resulting flywheel 10 is a far simpler structure than flywheels of the prior art, but which is capable of extremely high rates of rotation such as 32,000 R.P.M. for the embodiment illustrated. As a result, the rim of the present invention, particularly when combined with the hub illustrated in FIGS. 3, 4 and 5, permits extremely high efficiency energy storage for a given flywheel weight, but in a far simpler and less costly structure than heretofore known in the prior art.

Figure 6:
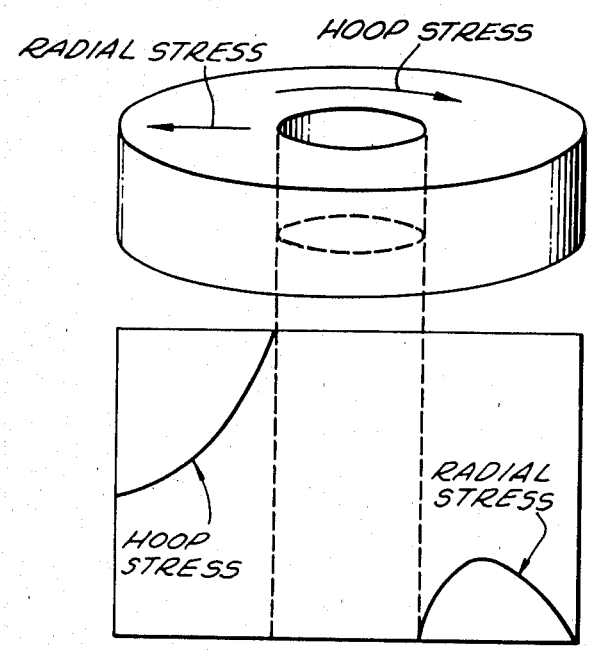
FIG. 6 is a graph of typical stresses induced in a conventional thick flywheel rim subjected to high rotational velocity.

The problems associated with the use of a thick, fiber composite material rim result from the high radial stress and unequal hoop stress usually incurred in such a wide rim of conventional design at high rotational velocities. FIG. 6 is illustrative of the stress problems associated with thick rims that have, prior to applicant's teaching as herein disclosed, resulted in unsolvable problems associated with destructive effects of such stresses on the fiber composite material rim. By way of example, in a typical embodiment of a conventional fiber material rim, the hoop stress varies from $2 \times 10^5$ to $5 \times 10^5$ psi. in accordance with the functional variation illustrated on the lower left side of FIG. 6, and the radial stress is varied between zero and $2 \times 10^4$ psi. in accordance with the stress curve illustrated on the lower right hand side of FIG. 6.

Figure 7:
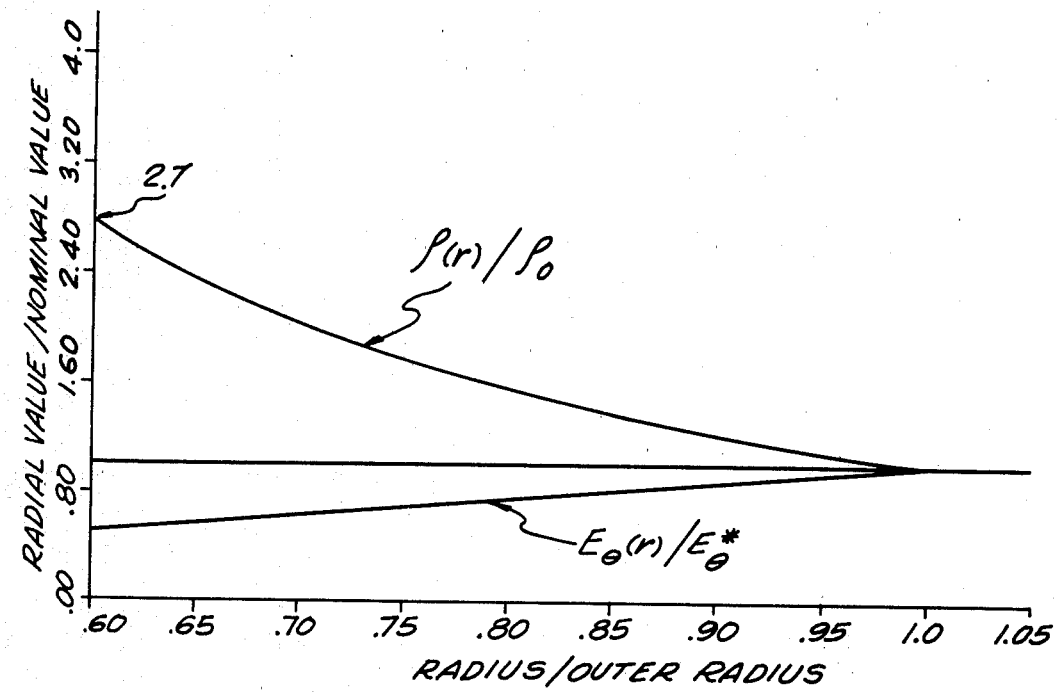
FIG. 7 is a graph of a ballasting function and of a modulus function of the invention.

It is the concept of the applicant that a thick rim composite flywheel can be achieved if the mass density as well as the hoop elastic modulus are varied in a prescribed radial manner herein to be disclosed. Specifically, the mass density should vary as $1/r_2$ and the hoop modulus should vary as r to the $(1 + \nu)$ power. Thus, the radial variation of mass and hoop elastic modulus may be expressed as:

$$\rho(r) = \rho_0(r/b)^{-2}$$

$$E_\theta(r) = E_\theta^*(r/b)^{1+\nu}$$

where
b = outer radius of disk
$\rho_o$ = mass density at outer radius (no ballast)
$E_\theta^*$ = hoop elastic modulus at outer radius FIG. 7 depicts the desired radial variation in mass density and in hoop elastic modulus. By way of example, FIG. 7 indicates that the mass density at a radius equal to 70% of the outer radius of the rim, should be approximately two times the density of the unballasted fiber material. Similarly, the hoop elastic modulus at the same point along the radius of the rim should be approximately 63% of the value of the hoop elastic modulus at the outer radius of the rim.

Figure 8:
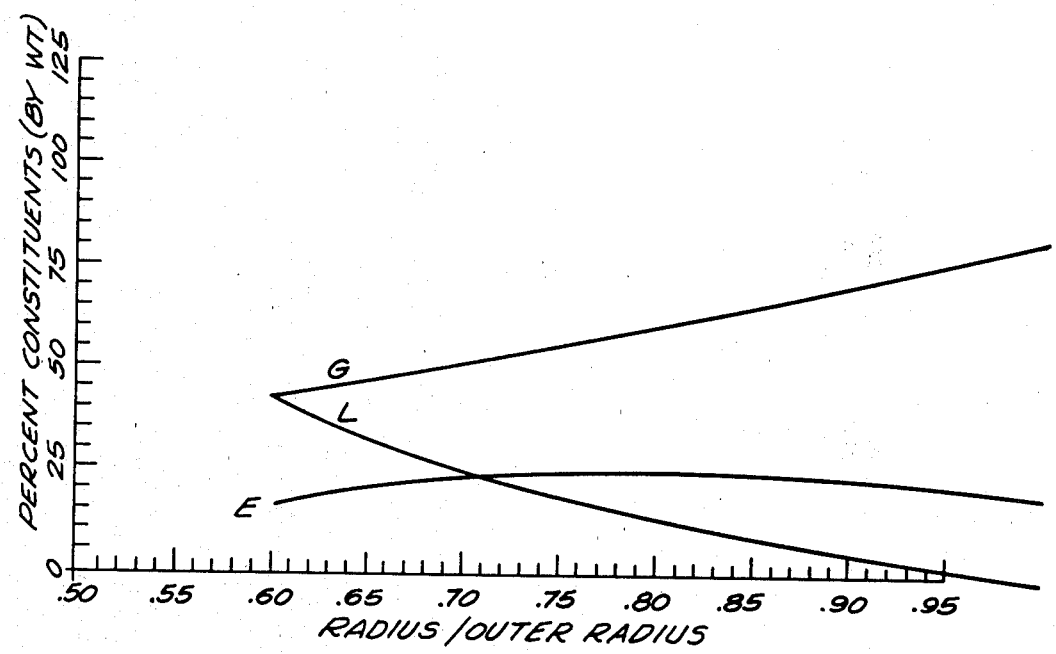
FIGS. 8 and 9 are graphs by weight and volume of a fiber-epoxy-ballasting distribution function of the invention.
Figure 9:
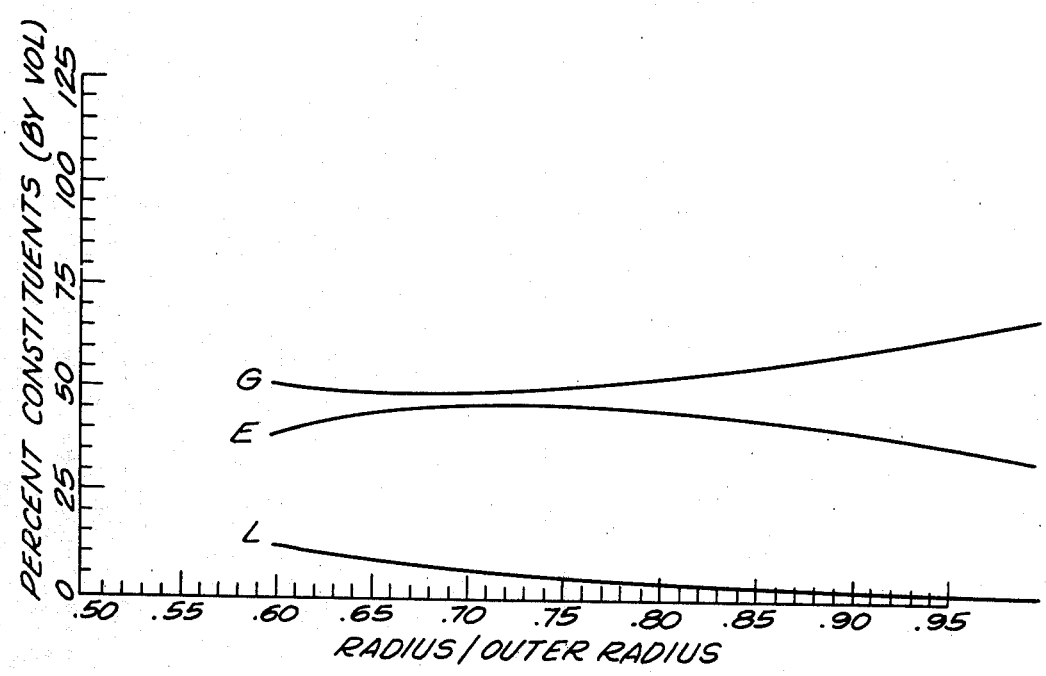

One method of achieving the radial variation in mass density and hoop modulus is to mix the fiber, the epoxy and a ballasting material, such as lead powder, in different ratios as the fiber-epoxy-lead mixture is wound to form the rim. FIGS. 8 and 9 are graphs of the variation of these three constituent parts of the rim of the present invention, showing their variation in percentage as a function of rim radius. FIG. 8 illustrates this variation as a function of percentage by weight and FIG. 9 illustrates this variation as a function of percentage by volume.

Whereas the kinetic energy storage of a thick rim composite flywheel without ballasting or modulus variation is limited by the high hoop and radial stress components discussed previously in conjunction with FIG. 6, the thick rim composite flywheel with the aforementioned ballasting and modulus variations has the following stress and deformation components:

$$\rho_r(r) = 0$$

$$\rho_\theta(r) = \rho_o \omega^2 b^2$$

$$u_r = \rho_o \omega^2 b^3 (r/b) \cdot \nu / E_\theta^*$$

Thus the radial stress for an ideal variation of ballasting and modulus as depicted in FIG. 7 is zero and the hoop stress is a constant equal to the product of the mass density and the peripheral speed of the rim squared.

It will, however, be recognized by those familiar with the flywheel art and particularly with fiber composite material rims thereof, that the ideal curves of mass density and modulus variation illustrated in FIG. 7, offer certain practical implementation problems associated with the fabrication of such a rim. However, applicant has found that by using an approximation step-function variation in ballasting and fiber-epoxy-ballasting ratio, it is possible to approach the ideal curves of FIG. 7 to a sufficient degree to achieve virtually zero radial stress and virtually constant hoop stress. This approximation technique is achieved by keeping the fiber-epoxy ratio constant over a fractional portion of the rim radius as the fiber material composite is wound and then changing the fiber-epoxy fraction to a new constant value for each subsequent fractional portion of the rim radius. Similarly, the density is varied linearly over each such fractional portion of rim radius by linear ballasting within each portion.

Figure 10:
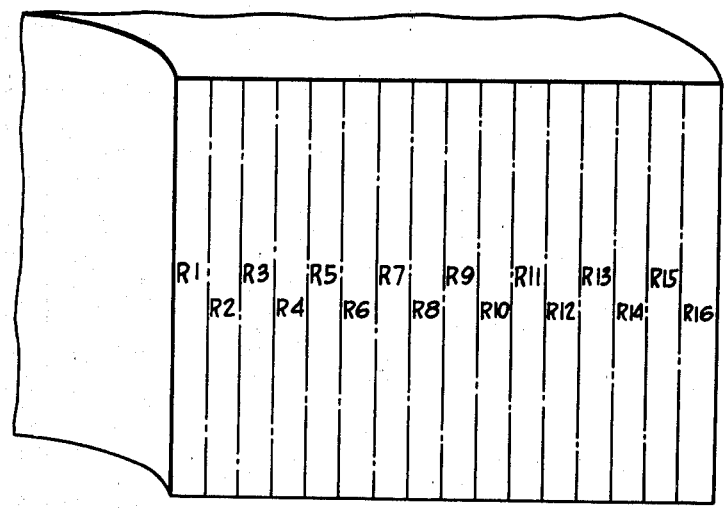
FIG. 10 is a cross-section graphical view of a preferred embodiment of a flywheel rim of the present invention.

One such practical approximation rim is depicted in cross-section in FIG. 10. In this particular embodiment the inner radius is 6 inches and the outer radius is 10 inches. Over this radial variation, the rim has been divided into 16 regions, R 1 through R 16. Within each region the modulus of elasticity, determined by the ratio of fiber and epoxy, is held constant, and the density of the material, determined by the amount of ballasting by means of the addition of lead powder, decreases linearly. The specific parameters utilized in this particular embodiment for fiber-epoxy ratio and ballasting are indicated below in Table I. Each region, R 1 through R 16, is 0.25 inches in radial dimension.

TABLE I

| RIM REGION | BALLASTING DENSITY | | MODULUS ($\times 10^{-6}$) |
|---|---|---|---|
| | (INNER $\times 10^{-3}$) | (OUTER $\times 10^{-3}$) | |
| R 1 | .5600 | .5161 | 4.436 |
| R 2 | .5161 | .4772 | 4.666 |
| R 3 | .4772 | .4425 | 4.899 |
| R 4 | .4425 | .4114 | 5.134 |
| R 5 | .4114 | .3836 | 5.372 |
| R 6 | .3836 | .3584 | 5.611 |
| R 7 | .3584 | .3357 | 5.853 |
| R 8 | .3357 | .3150 | 6.097 |
| R 9 | .3150 | .2962 | 6.343 |
| R 10 | .2962 | .2790 | 6.591 |
| R 11 | .2790 | .2633 | 6.841 |
| R 12 | .2633 | .2489 | 7.094 |
| R 13 | .2489 | .2356 | 7.347 |
| R 14 | .2356 | .2234 | 7.603 |
| R 15 | .2234 | .2120 | 7.861 |
| R 16 | .2120 | .2016 | 8.120 |

Figure 11:
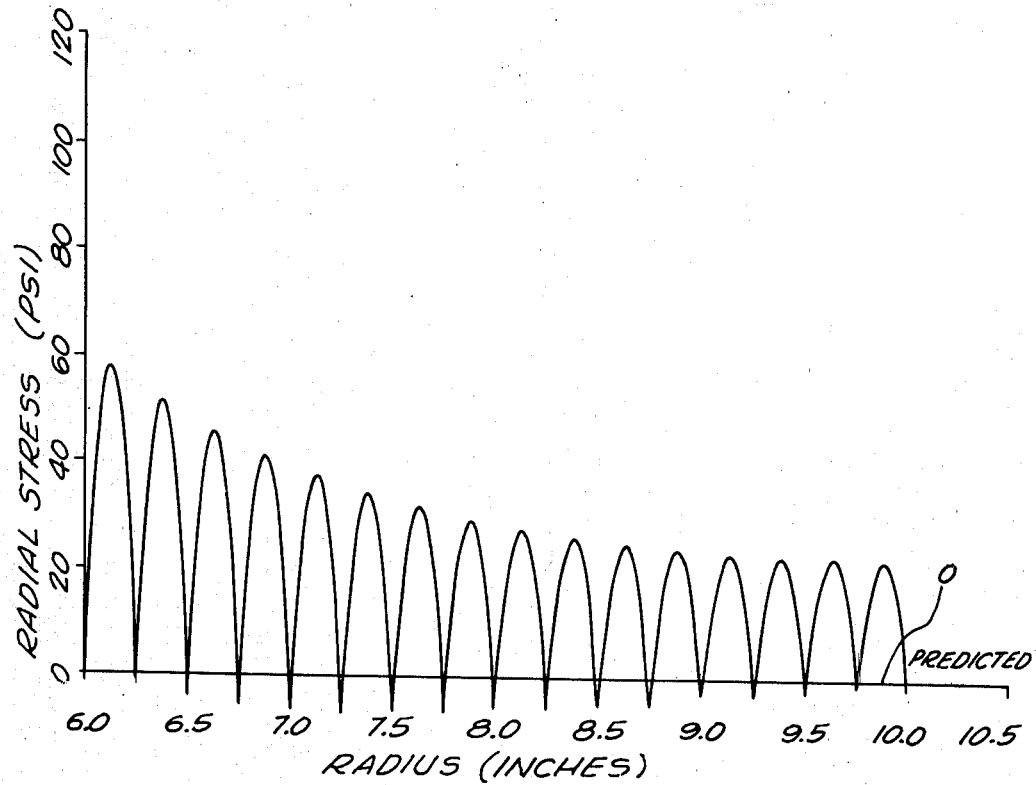
FIGS. 11 and 12 are graphs of the rotational-velocity-induced stresses in a preferred embodiment of the rim of the present invention.
Figure 12:
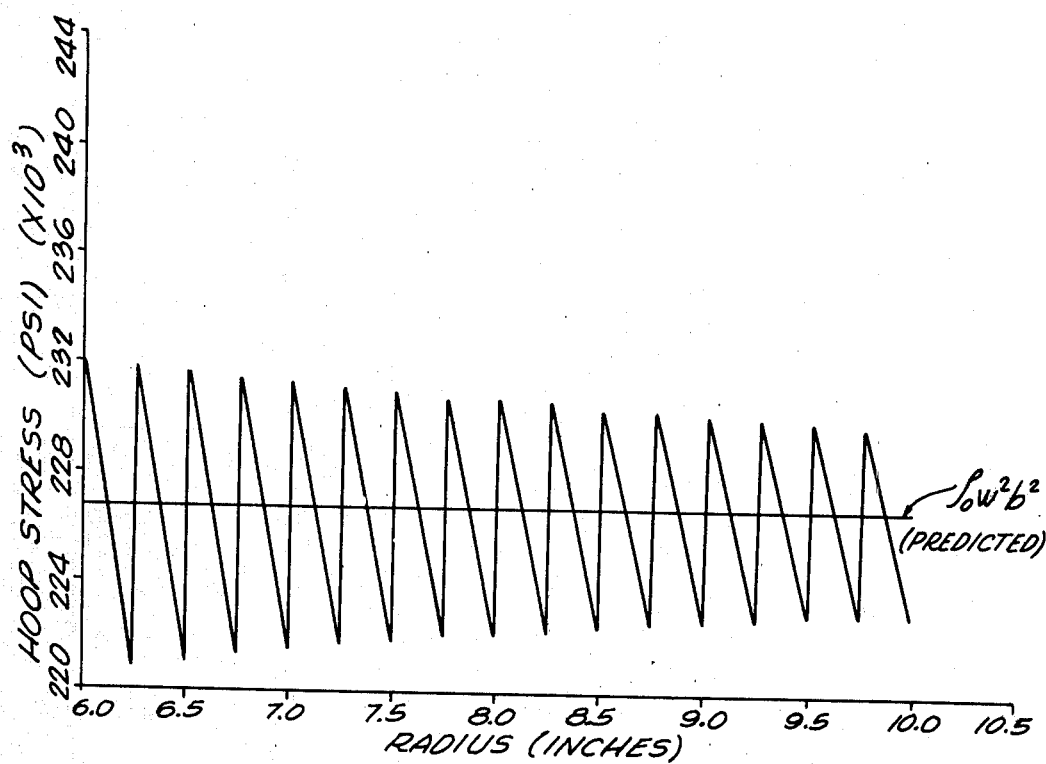

The radial stress and hoop stress for the step function approximation of density and modulus variation indicated in table I are illustrated in FIGS. 11 and 12, respectively. As indicated in FIG. 11, the radial stress varies between a minimum of about 20 psi. and a maximum of about 60 psi., which is trivial as compared to the maximum radial stress $2 \times 10^4$ psi. discussed previously in conjunction with FIG. 6 for a conventional thick rim fiber composite flywheel. As illustrated in FIG. 12, the hoop stress varies from a minimum of about $221 \times 10^3$ psi. to a maximum of about $232 \times 10^3$ psi. as a function of radius. Here again, the hoop stress variation of a total of about 11,000 psi. is substantially less than the hoop stress variation of $2 \times 10^5$ psi. to $5 \times 10^5$ psi. discussed in conjunction with FIG. 6 for the conventional thick rim.

Figure 13:
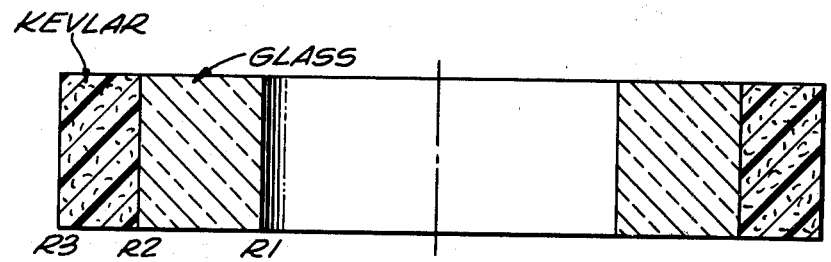
FIG. 13 is cross-sectional view of a first alternative embodiment of the invention.

It will now be apparent that inasmuch as the thick rim composite flywheel can store significantly more kinetic energy than the thin rim composite flywheel for the same swept volume, a multilayer composite rim such as that illustrated in FIG. 13, also provides the mechanism for increasing the radial thickness of a thin rim. The fundamental features of the multilayer thick rim of FIG. 13 are:

A. The inner-rim is characterized by relatively low-cost linearly ballasted, dense, low modulus composite material (e.g., E-Glass with powdered lead); and B. The outer-rim is characterized by a higher-cost, unballasted, lightweight, high modulus composite material (e.g., Kevlar).

The objectives of this alternative embodiment of the invention are:

A. To achieve a thick rim while eliminating the need for the multi-rim concept of the prior art;

B. Ballast the inner-rim to increase its kinetic energy as well as to cause a higher contact stress with the outer restraining rim; and C. Eliminate the inter-rim connections and the inherent high parts count necessary for the multi-rim flywheel of the prior art.

Figure 14:
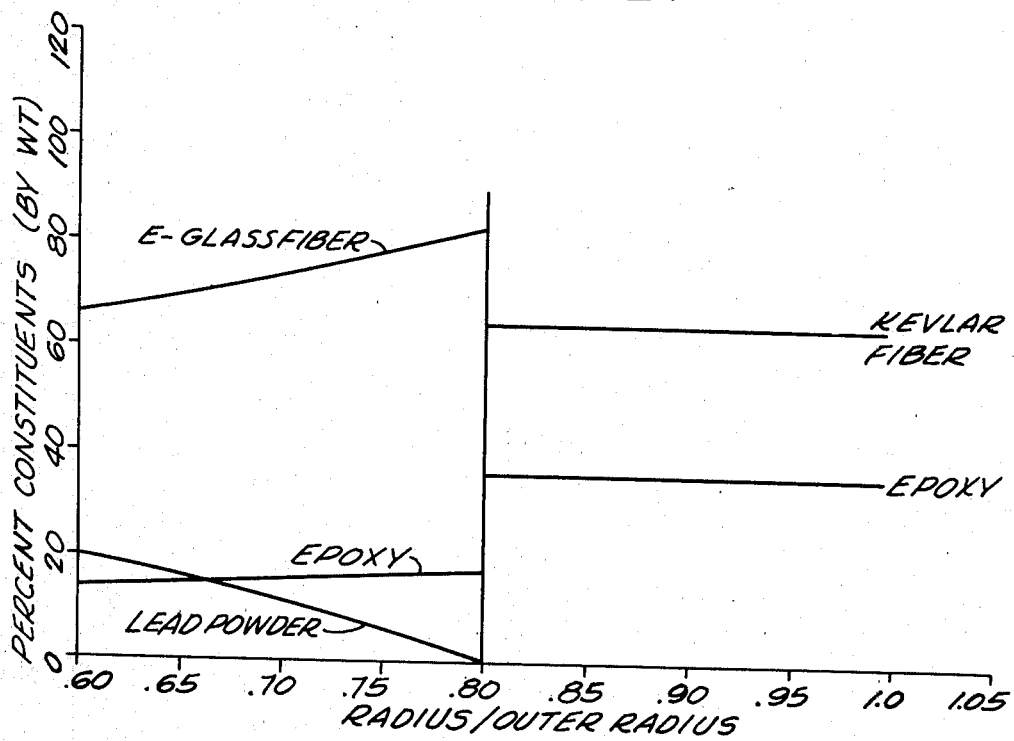
FIGS. 14 and 15 are graphs by weight and volume of a fiber-epoxy-ballasting distribution function of the first alternative embodiment of the invention.
Figure 15:
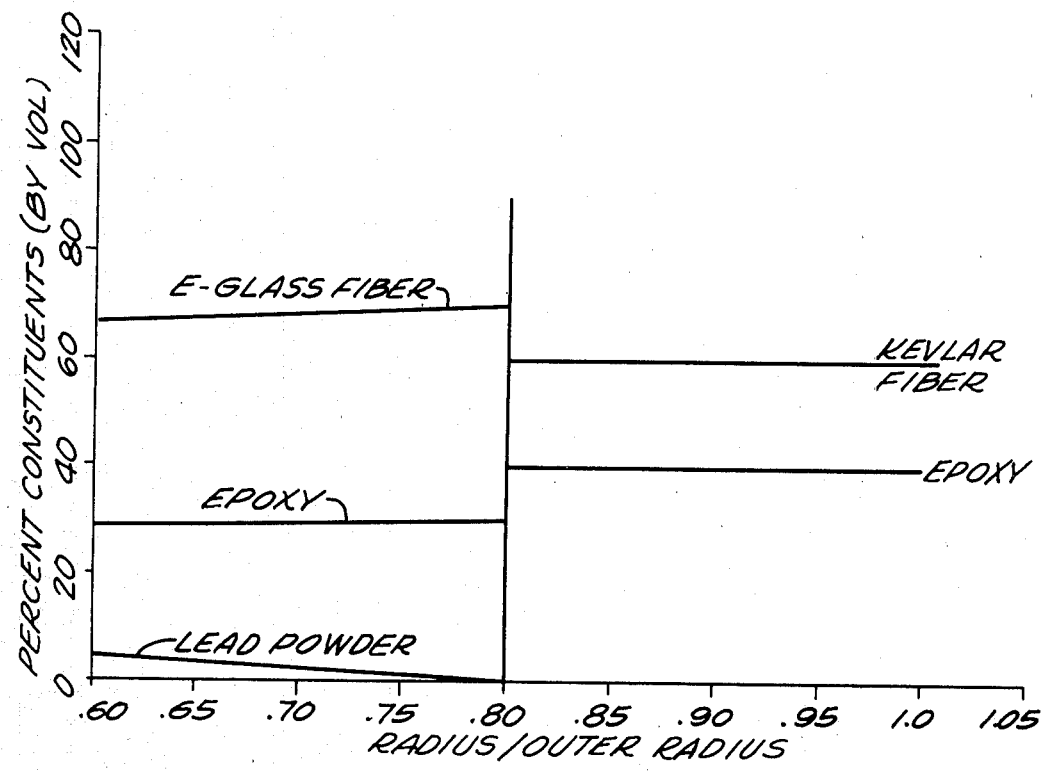

FIGS. 14 and 15, respectively, illustrate the variation of constituents by weight and volume of the double layer thick fiber composite material rim of FIG. 13 in which the inner-rim is comprised of E-Glass, epoxy, and lead and in which the outer-rim is comprised of Kevlar and epoxy. The theory behind the concentric composite disk concept of FIG. 13 will now be discussed in conjunction with FIGS. 16 and 17.

The stress and deformation equations for a linearly varying mass density, polar orthotropic composite flywheel are now discussed. In developing the appropriate equation, certain fundamental assumptions have been made:

A. The mass density of the composite varies linearly with respect to the radial coordinate;

B. The materials can be characterized by the moduli and Poisson's ratios of a polar orthotropic material; and C. The material properties, the structure and the loading are axisymmetric.

The fundamental strain-displacement relations for this axisymmetric structure are $$\epsilon_r = \frac{du}{dr} \quad \epsilon_\theta = \frac{u}{r} \tag{1}$$

The stress-strain relations can be expressed in polar coordinate form as $$\epsilon_r = \frac{\sigma_r}{E_r} - \frac{\nu_{\theta r} \sigma_\theta}{E_\theta} \tag{2}$$

$$\epsilon_\theta = \frac{\sigma_\theta}{E_\theta} - \frac{\nu_{r\theta} \sigma_r}{E_r}$$

When a single disk of variable mass density rotates at a constant angular speed $\omega$, the force equilibrium equation in the radial direction is given by $$\frac{d}{dr}(r\sigma_r) - \sigma_\theta + \rho(r)\omega^2 r^2 = 0 \tag{3}$$

The equilibrium equation can be expressed in terms of the radial displacement u as $$E_r r^2 \frac{d^2 u}{dr^2} + E_r r \frac{du}{dr} - E_\theta u = -\rho(r)\omega^2 (1 - \nu_{\theta r}\nu_{r\theta}) r^3 \tag{4}$$

In deriving equation 4 it was assumed that the material parameters satisfied the symmetry of stiffness coefficients of the stress-strain relations such that $E_r \nu_{\theta r} = E_\theta \nu_{r\theta}$. Assume further that the mass density of the composite varies linearly with respect to the radius such that $$\rho(r) = \frac{(bp_a - ap_b)}{b-a} + \frac{(\rho_b - \rho_a)}{b-a} r \qquad (5)$$

The linear variation of the mass density can be achieved by combining modest amounts of lead powder to the epoxy matrix material. The general solution to the differential equation 4, subject to the mass variation given in equation 5, is $$u = C_1(1+k)(k - \nu_{\theta r})(r/b)^k - C_2(1-k)(k + \nu_{\theta r})(r/b)^{-k} - \qquad (6)$$

$$\frac{\omega^2(1 - \nu_{\theta r}\nu_{r\theta})r^3}{b-a}\left\{\frac{(bp_a - ap_b)}{9 E_r - E_\theta} + \frac{(\rho_b - \rho_a)}{16 E_r - E_\theta} r\right\}$$

The constants $C_1$ and $C_2$ can be determined from the radial stress boundary conditions of $$\sigma_r(a) = 0 \; \sigma_r(b) = 0 \qquad (7)$$

The solution of equaton 6 subject to the radial stress boundary conditions gives the radial displacement u as $$\frac{\omega^2 b^3(k - \nu_{\theta r})(r/b)^k}{E_\theta(b-a)(C^k - C^{-k})}\left\{\frac{(bp_a - ap_b)(3 + \nu_{\theta r})(C^3 - C^{-k})}{9 - k^2} + \right.$$

$$\left. \frac{b(\rho_b - \rho_a)(4 + \nu_{\theta r})(C^4 - C^{-k})}{16 - k^2}\right\} +$$

$$\frac{\omega^2 b^3(k + \nu_{\theta r})(r/b)^{-k}}{E_\theta(b-a)(C^k - C^{-k})}\left\{\frac{(bp_a - ap_b)(3 + \nu_{\theta r})(C^3 - C^{k})}{9 - k^2} + \right.$$

$$\left. \frac{b(\rho_b - \rho_a)(4 + \nu_{\theta r})(C^4 - C^{k})}{16 - k^2}\right\} -$$

$$\frac{\omega^2 b^3(k^2 - \nu_{\theta r}^2)(r/b)^3}{E_\theta(b-a)}\left\{\frac{(bp_a - ap_b)}{9 - k^2} + \frac{b(\rho_b - \rho_a)(r/b)}{16 - k^2}\right\}$$

Knowing the radial displacement, the radial and hoop stress components can be found from $$\sigma_\theta(r) = \frac{E_\theta}{1 - \nu_{r\theta}\nu_{\theta r}}\left(\frac{u}{r} + \nu_{r\theta}\frac{du}{dr}\right) \qquad (9)$$

$$\sigma_r(r) = \frac{E_r}{1 - \nu_{r\theta}\nu_{\theta r}}\left(\frac{du}{dr} + \nu_{\theta r}\frac{u}{r}\right)$$

Thus radial stress is $$\sigma_r = \qquad (10)$$

$$\frac{\omega^2 b^2(r/b)^{k-1}}{(b-a)(C^k - C^{-k})}\left\{\frac{(bp_a - ap_b)(3 + \nu_{\theta r})(C^3 - C^{-k})}{9 - k^2} + \right.$$

-continued $$\left. \frac{b(\rho_b - \rho_a)(4 + \nu_{\theta r})(C^4 - C^{-k})}{16 - k^2}\right\} -$$

$$\frac{\omega^2 b^2(r/b)^{-k-1}}{(b-a)(C^k - C^{-k})}\left\{\frac{(bp_a - ap_b)(3 + \nu_{\theta r})(C^3 - C^{k})}{9 - k^2} + \right.$$

$$\left. \frac{b(\rho_b - \rho_a)(4 + \nu_{\theta r})(C^4 - C^{k})}{16 - k^2}\right\} -$$

$$\frac{\omega^2 b^2(r/b)^2}{(b-a)}\left\{\frac{(3 + \nu_{\theta r})(bp_a - ap_b)}{9 - k^2} + \right.$$

$$\left. \frac{b(\rho_b - \rho_a)(4 + \nu_{\theta r})(r/b)}{16 - k^2}\right\}$$

and the hoop stress is $$\sigma_\theta = \qquad (11)$$

$$\frac{\omega^2 b^2 k (r/b)^{k-1}}{(b-a)(C^k - C^{-k})}\left\{\frac{(bp_a - ap_b)(3 + \nu_{\theta r})(C_3 - C^{-k})}{9 - k^2} + \right.$$

$$\left. \frac{b(\rho_b - \rho_a)(4 + \nu_{\theta r})(C^4 - C^{-k})}{16 - k^2}\right\} +$$

$$\frac{\omega^2 b^2 k(r/b)^{-k-1}}{(b-a)(C^k - C^{-k})}\left\{\frac{(bp_a - ap_b)(3 + \nu_{\theta r})(C^3 - C^{k})}{9 - k^2} + \right.$$

$$\left. \frac{b(\rho_b - \rho_a)(4 + \nu_{\theta r})(C^4 - C^{k})}{16 - k^2}\right\} -$$

$$\frac{\omega^2 b^2(r/b)^2}{(b-a)}\left\{\frac{(k^2 + 3 \nu_{\theta r})bpbv_a - ap_b)}{9 - k^2} + \right.$$

$$\left. \frac{(k^2 + 4 \nu_{\theta r})b(\rho_b - \rho_a)(r/b)}{16 - k^2}\right\}$$

Note that the degenerate case of $\rho_a = \rho_b$ coincides with the usual orthotropic theory which, in turn, is an extension of the classical isotropic solution.

The single rim, multilayer composite flywheel design assumes a relatively inexpensive, ballasted glass fiber inner-rim contained by a Kevlar outer-rim. Schematically this concept is depicted by the two concentric orthotropic disks shown in FIG. 13.

To determine the total stress and deformation distribution of the concentric disks, one must insure that there is a continuity of radial stress and radial displacement at the interface of the two disks. These conditions will be satisfied by the following solution strategy:

1. Determine the radial growth of each composite disk individually at the interface due to spinning. See equation (8). Denote the radial growth of disk 1 as $u_{r1}$ ($\omega$) and the radial growth of disk 2 as $u_{r2}(\omega)$. Determine the interference of radial growth as $$u_{r1}(\omega) - u_{r2}(\omega) = \Delta u$$

2. Assume a contact pressure p on the exterior surface of disk 1 and the interior surface of disk 2. The contact pressure p is such that it causes a diametrical contraction of disk 1 and a diametrical expansion of disk 2. Denoting the radial expansion and contraction due to the pressure p as $u_{R2}(p)$ and $u_{r1}(p)$ respectively, then the pressure p is determined from the relationship $$u_{r1}(p) + u_{r2}(p) = \Delta u = u_{r1}(\omega) - u_{r2}(\omega)$$

3. Knowing the contact pressure p the total stress and deformation distribution in the disks can be determined. The final stresses and deformations will be due to the contact pressure p and the angular velocity $\omega$.

The stress and deformation relations due to the angular velocity are given by equations (8), (10), and (11). Designating q and $q_E$ as the magnitudes of the internal and external pressures of a polar orthotropic disk, the radial displacement, radial stress, and hoop stress relations can be shown to be:

Radial Displacement $$u = \frac{b}{E_\theta (1 - C^{2k})} \{(q_I C^{k+1} - q_E)(k - \nu_{\theta r})(r/b)^k + \quad (12)$$

$$(q_I - q_E C^{k-1})(k + \nu_{\theta r}) C^{k+1} (r/b)^{-k}\}$$

Radial Stress $$\sigma_r = \frac{q_I C^{k+1} - q_E}{1 - C^{2k}} (r/b)^{k-1} - \frac{q_I - q_E C^{k-1}}{1 - C^{2k}} C^{k+1} (r/b)^{-k-1} \quad (13)$$

Hoop Stress $$\sigma_\theta = \frac{q_I C^{k+1} - q_E}{1 - C^{2k}} k(r/b)^{k-1} + \frac{q_I - q_E C^{k-1}}{1 - C^{2k}} kC^{k+1}(r/b)^{-k-1} \quad (14)$$

Figure 16:
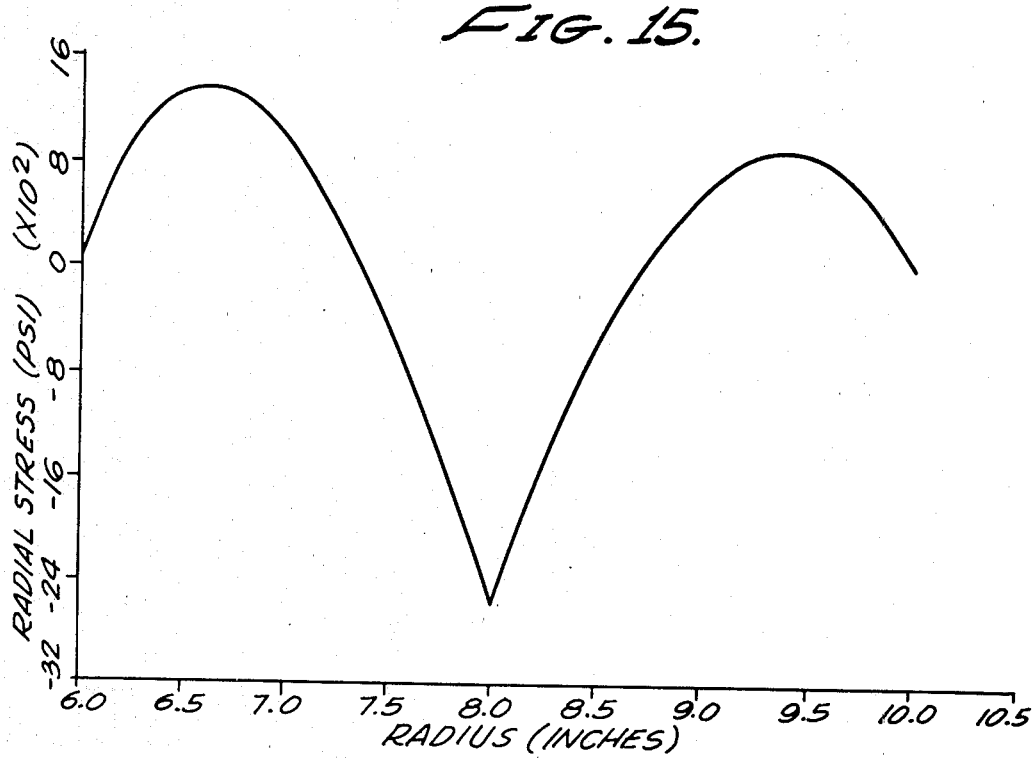
FIGS. 16 and 17 are graphs of the rotational velocity induced stresses in the first alternative embodiment of the invention of FIGS. 13 through 15.
Figure 17:
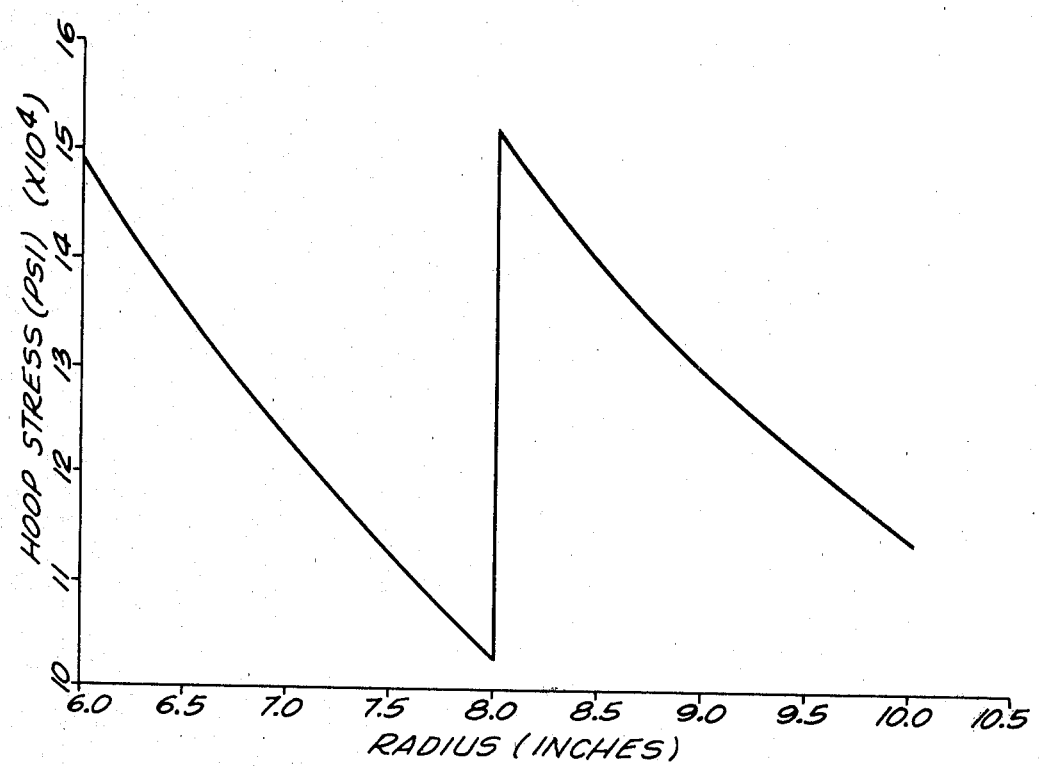

For a candidate design of a ballasted E-Class inner rim and a Kevlar outer rim, the graphs of the stresses are depicted in FIGS. 16 and 17.

To determine the kinetic energy of a ballasted rim, assume that the mass density of a rim can be expressed as $$\rho(r) = m_0(1 - \gamma r/b) \quad (15)$$

By comparing expressions 5 and 15 it is evident that $$m_o = \rho_b \left( \frac{\rho_a/\rho_b - a/b}{1 - a/b} \right) \text{ and } \gamma = \frac{1 - \rho_a/\rho_b}{a/b - \rho_a/\rho_b}$$

The kinetic energy of a rotating disk of height h is therefore $$K.E. = \frac{1}{2} \int_a^b m_0(1 - \gamma r/b) \omega^2 r^2 h 2\pi r \, dr \quad (16)$$

$$K.E. = \pi \omega^2 m_0 b^4 h \{(1 - C^4)/4 - \gamma (1 - C^5)/5\}$$

To determine the total kinetic energy of a single rim composed of concentric orthotropic disks, one would, of course sum the kinetic energy for each disk based upon equation 16.

During fabrication of the double layer thick fiber composite material rim of FIG. 13, it may be desirable to take advantage of the negative coefficient of thermal expansion of Kevlar by first reducing its temperature to about $-45°$ degrees Farenheit before slipping the Kevlar outer layer over the already wound E-Glass ballasted inner layer. By then allowing the Kevlar to warm to ambient temperature, and thus contract around the inner layer, the appropriate contact pressure p is easily obtained.

Figure 18:
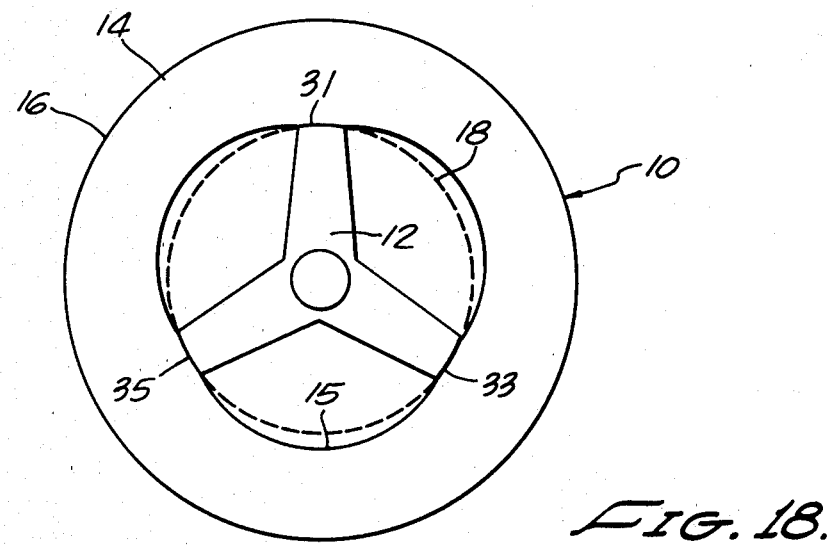
FIG. 18 illustrates a slack winding technique used in a second alternative embodiment of the invention.

FIG. 18 illustrates still another alternative embodiment of the present invention which incorporates an additional novel technique of fabrication to reduce hoop stresses in the rim at high rotational velocities.

An important factor involved in the hoop stress being higher on the inside of a conventional thick rim, as depicted previously in FIG. 6, is the shorter length of the fiber material on the inside of the rim due to the smaller diameter at that point. In order to progressively reduce the hoop stress as the radius approaches the inner rim it is a feature of the present invention to add additional length to the winding of fibers on the inside surface of the rim and to progressively shorten the added length of the fibers making up the rim so that, in effect, slack in the rim winding occurs in the inner portion of the rim with this slack or added length approaching zero towards the outer portion of the rim where the winding approaches and reaches a circular configuration. FIG. 18 illustrates this concept in conjunction with a three-legged double-dome-shaped spider hub such as that disclosed, in co-pending patent application Ser. No. 942,054, filed concurrently herewith. As disclosed in FIG. 18, a flywheel 10 has a three-legged hub 12. A fiber composite material rim 14 is wound around the legs 31, 33 and 35, respectively, of hub 12. Ordinarily, rim 14 would be configured to have a circular inner radius 15 and a circular outer radius 16. However, the slack concept of the present invention calls for use of a mandrel with a circumference between the respective legs of the hub 12 of greater length than the circular arc over the same distance. As a result, during the winding of the fiber, a bulge is created in each of the spaces between the spider legs 31, 33 and 35 at the periphery of the mandrel. This bulge results from slack in the fiber during spinning of the rim. Length beyond the circular shape results from a greater amount of fiber than there would be in a true circle. The size of this bulge diminishes as the fiber is wound outwardly towards the exterior of the rim, so that by the time the external radius is being wound, a true circular shape is achieved as represented by the outer radius 16 of FIG. 13. This super-circular or slack winding feature equalizes the hoop stresses across the radial thickness of the rim by reducing the elongation of the fiber induced at high rotational velocities at the inside of the rim so that it approaches the smaller elongation produced by high rotational velocities at the outside of the rim.

Reference will now be made to FIGS. 19 through 24 for description of still another alternative embodiment of the present invention.

In constructing a thick rim, fiber composite material flywheel, it is advantageous to create a pre-stress state in the rim by winding the fibers with high tensile stress. The tension winding process establishes a pre-stress state that helps overcome the high radial stresses developed during the high rotational velocity, while taking advantage of the residual hoop strength available in the outer 50% of the radius of the thick rim. If the thick rim composite material flywheel is wound in a circular configuration, then the magnitude of the radial compressive stress at any particular radial location is dependent upon the magnitude of the tension winding stress, the thickness of the winding fibers, the radius of the rim and the number of fibers wound outboard of the particular radial location. The magnitude of the hoop tensile stress at a particular radial location is dependent upon the magnitude of the tension winding stress and the number of fibers wound outboard of the particular radial location. A uniform tension winding stress produces a radial compressive pre-stress state that varies approximately linearly with radius and also produces a hoop tensile pre-stress state.

Figure 19:
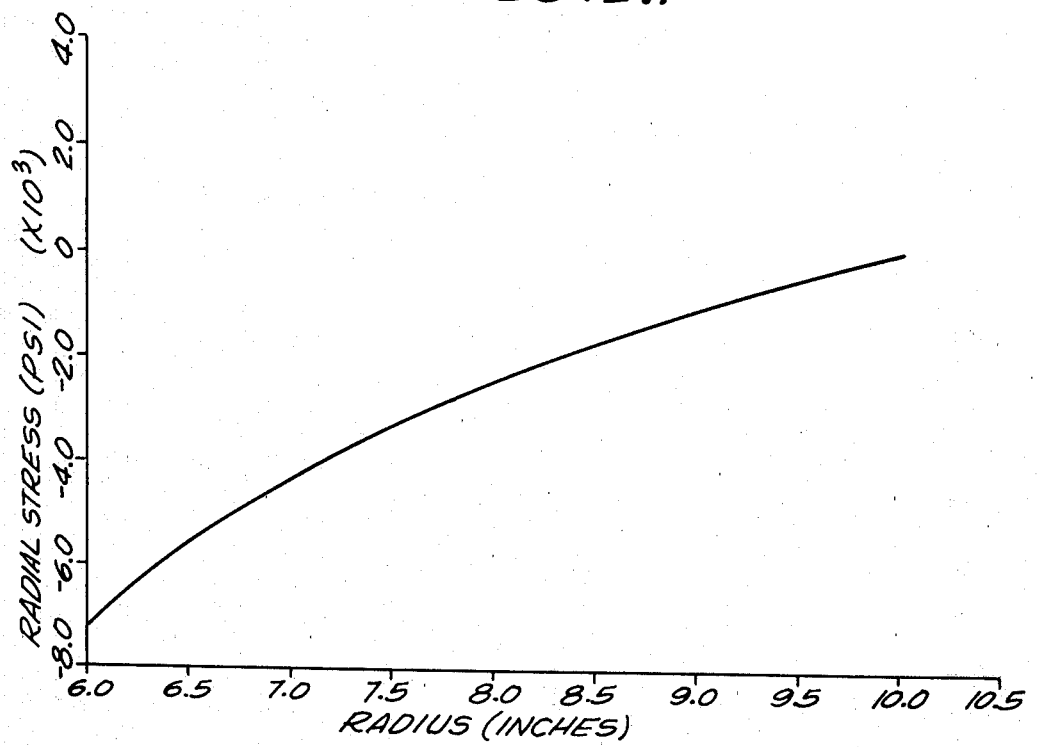
FIGS. 19 through 24 are graphs of radial contraction and of hoop and radial prestress conditions induced in still other embodiments of the invention by means of winding the fiber under two conditions of tension.
Figure 20:
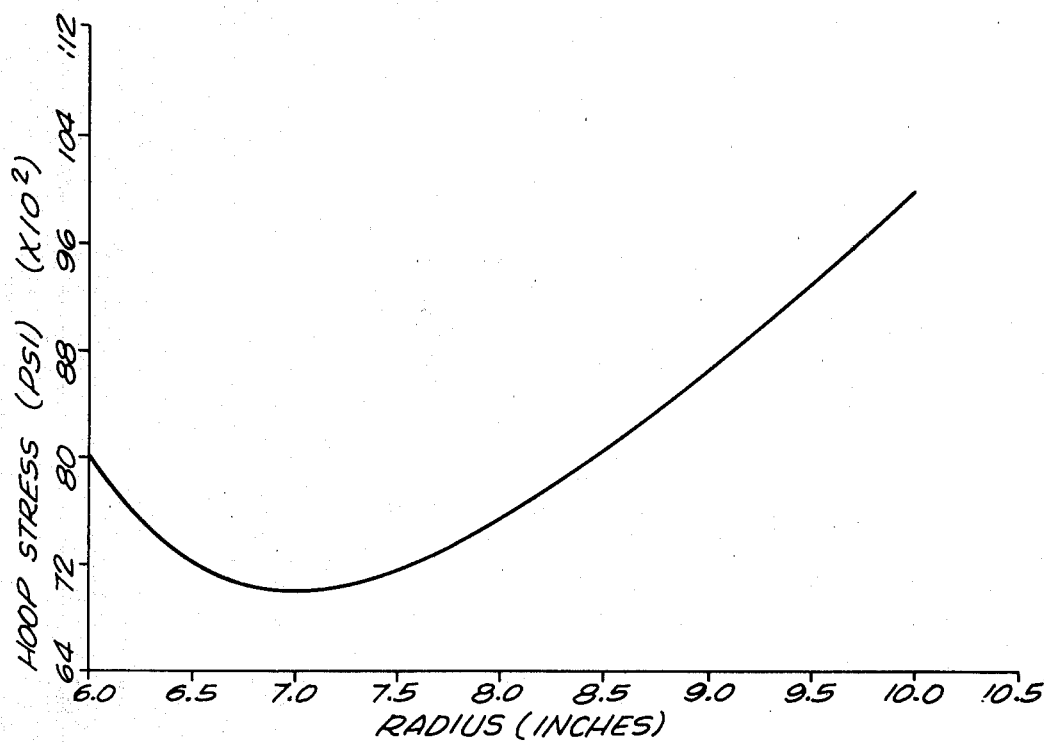
Figure 21:
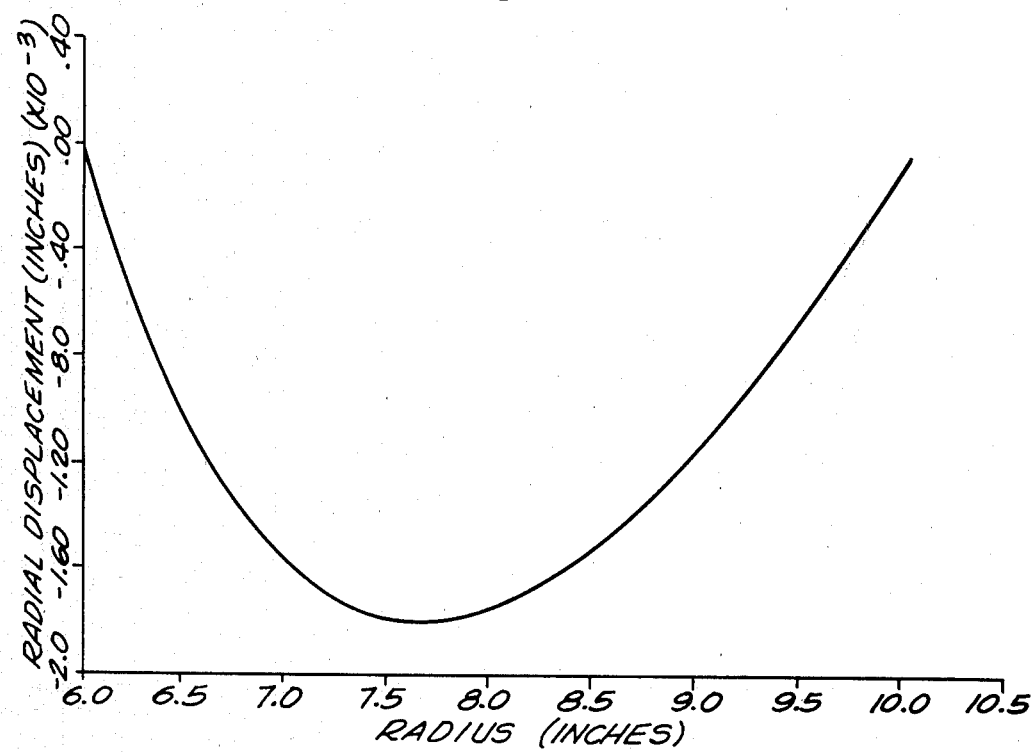

FIGS. 19, 20 and 21 illustrate, respectively, the radial stress, hoop pre-stress and radial contraction of a thick rim wound onto a rigid mandrel with a uniform winding stress of 10,000 psi.

Figure 22:
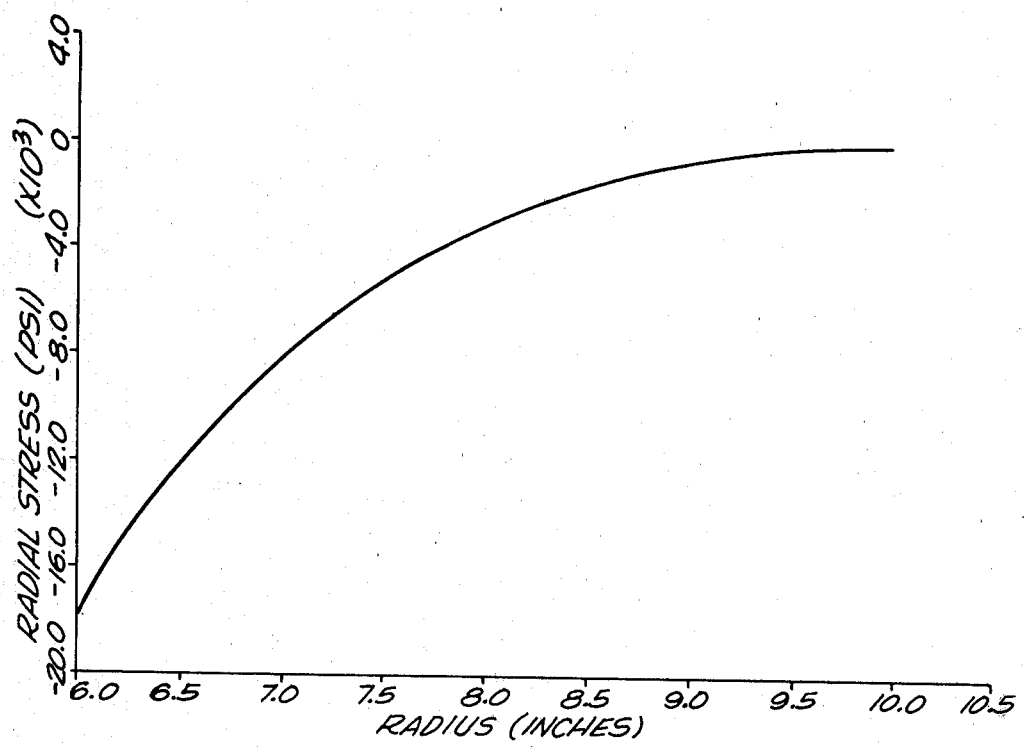
Figure 23:
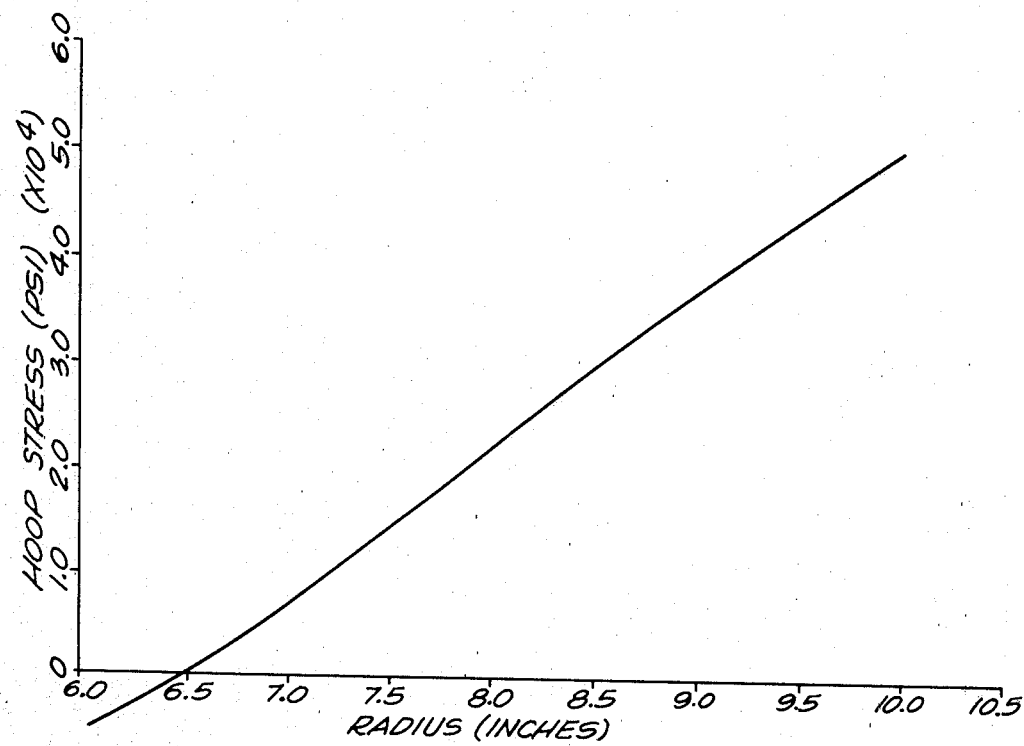
Figure 24:
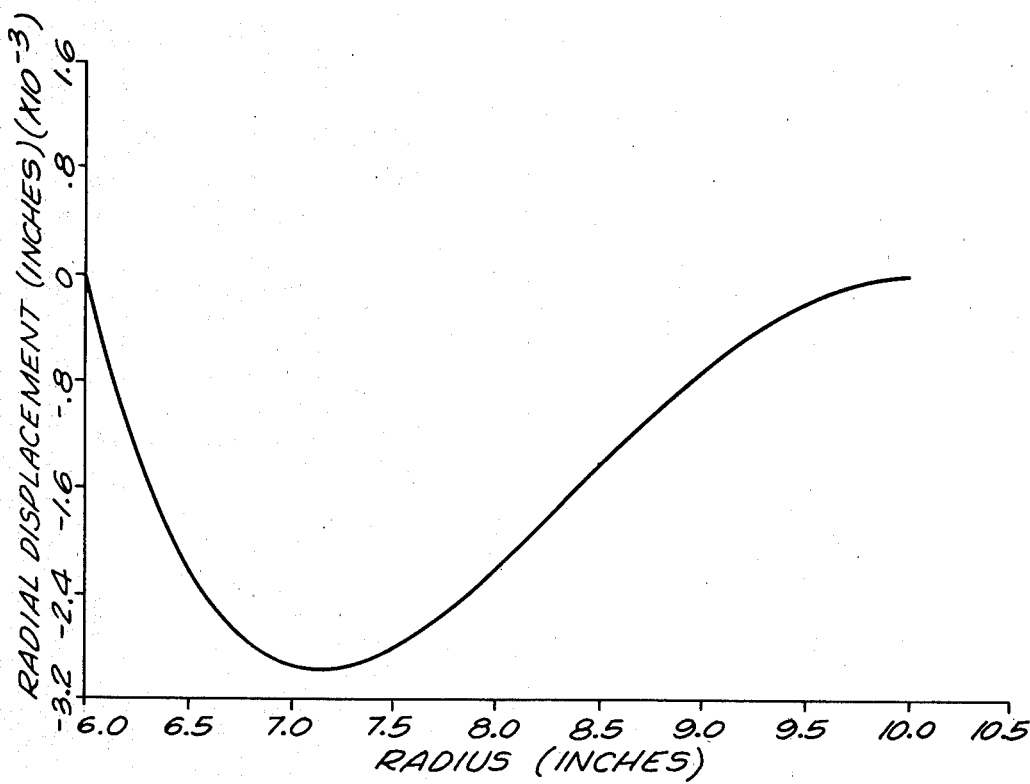

Tensile winding stress that increases linearly with rim radius produces a favorable radial compressive and hoop tensile pre-stress state. The pre-stress and deformation states of a thick rim composite material flywheel with a linearly increasing tension winding stress, up to a maximum of 50,000 psi., are illustrated in FIGS. 22, 23 and 24, respectively.

From FIGS. 19 through 24 it will be apparent that the process of winding a fiber to form a fiber composite material rim with tensile winding stress, results in a radial compressive pre-stress state, a favorable distribution of hoop tensile pre-stress and radial displacement contraction. Thus, this pre-stress and deformation state tends to overcome the stress and deformation state created during the high speed rotation of the rim and may be used independently or in conjunction with the previously descrived techniques for reducing radial stress and equalizing hoop stress at high velocities.

It will now be understood that what has been disclosed herein is a unitary, thick, fiber composite material rim for use in a flywheel kinetic energy storage device, the rim being fabricated by means of one or more novel techniques that diminish or resist the otherwise destructive effects of stresses induced at high rotational velocities.

Although a specific embodiment of the invention has been disclosed herein, it will now be apparent to those having ordinary skill in the art to which the invention pertains, that many other embodiments of the invention may be constructed. For example, in view of applicant's teaching herein disclosed it will now be apparent that there may be variations in materials, dimensions and basic design that would permit substantial deviations from the specific configuration disclosed herein by way of example. Illustrative of such variations is the use of alternative materials and the use of substantially larger dimensions suitable for a flywheel to be used to store tens of thousands of kilowatt-hours of energy so that utility companies could better equalize the energy requirements between maximum and minimum load periods during each 24-hour interval. Such high energy storage flywheels might have an overall diameter of 20 feet or more. Accordingly, the invention is not to be limited except as defined by the appended claims.

I claim:

1. A flywheel for storing kinetic energy and comprising:
    a double spider configuration hub having a pair of coaxial, oppositely facing, spaced-apart convex surfaces of substantially equal dimensions, said surfaces being interconnected by a plurality of legs spaced equidistantly around the perimeter of said hub; and
    each of said legs having a circumferential outward facing surface for support of a cylindrical flywheel rim, the axis of which is collinear with the axes of said convex surfaces;
    a unitary, thick rim, concentrically supported on said leg surfaces and having a first combination on fiber and epoxy matrix wound onto a substantially cylindrical configuration having an inner radius R1 and an outer radius R2 and
    a second combination of fiber and epoxy matrix wound into a substantially cylindrical configuration having an inner radius R2 and an outer radius R3;
    the mass density per unit volume of said first combination being greater than the mass density per unit volume of said second combination; and
    the elastic modulus of said second combination being greater than the elastic modulus of said first combination.

2. A flywheel as defined in claim 1, wherein the fiber of said first combination is E-Glass and the fiber of said second combination is Kevlar.

3. A flywheel as defined in claim 1, in which the mass density per unit volume of said first combination varies as a function of rim radius by means of ballasting said first combination with a pre-selected quantity of substantially higher density material, said quantity being greatest at R1 and decreasing with increasing rim radius.

* * * * *